Patented June 19, 1923.

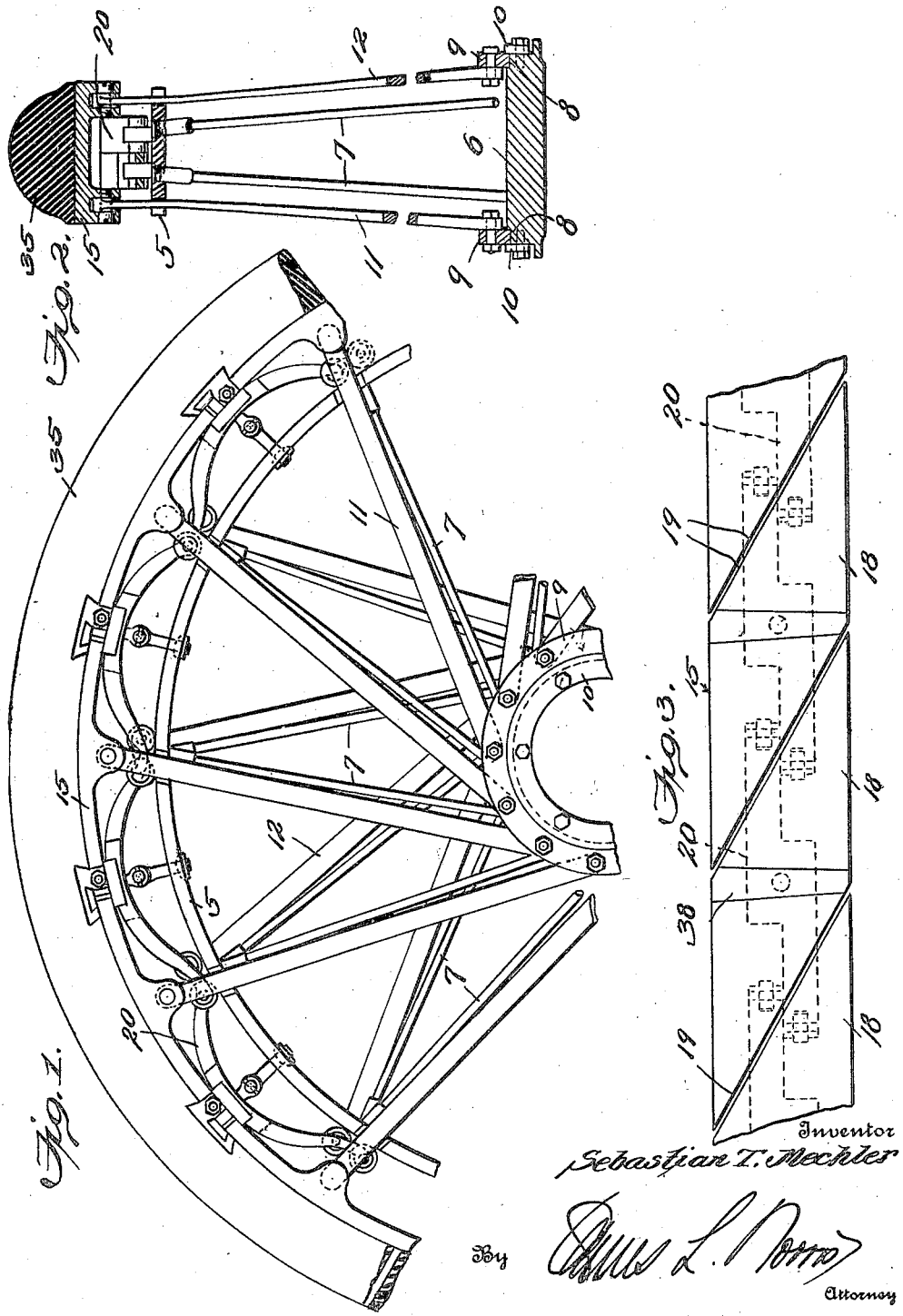

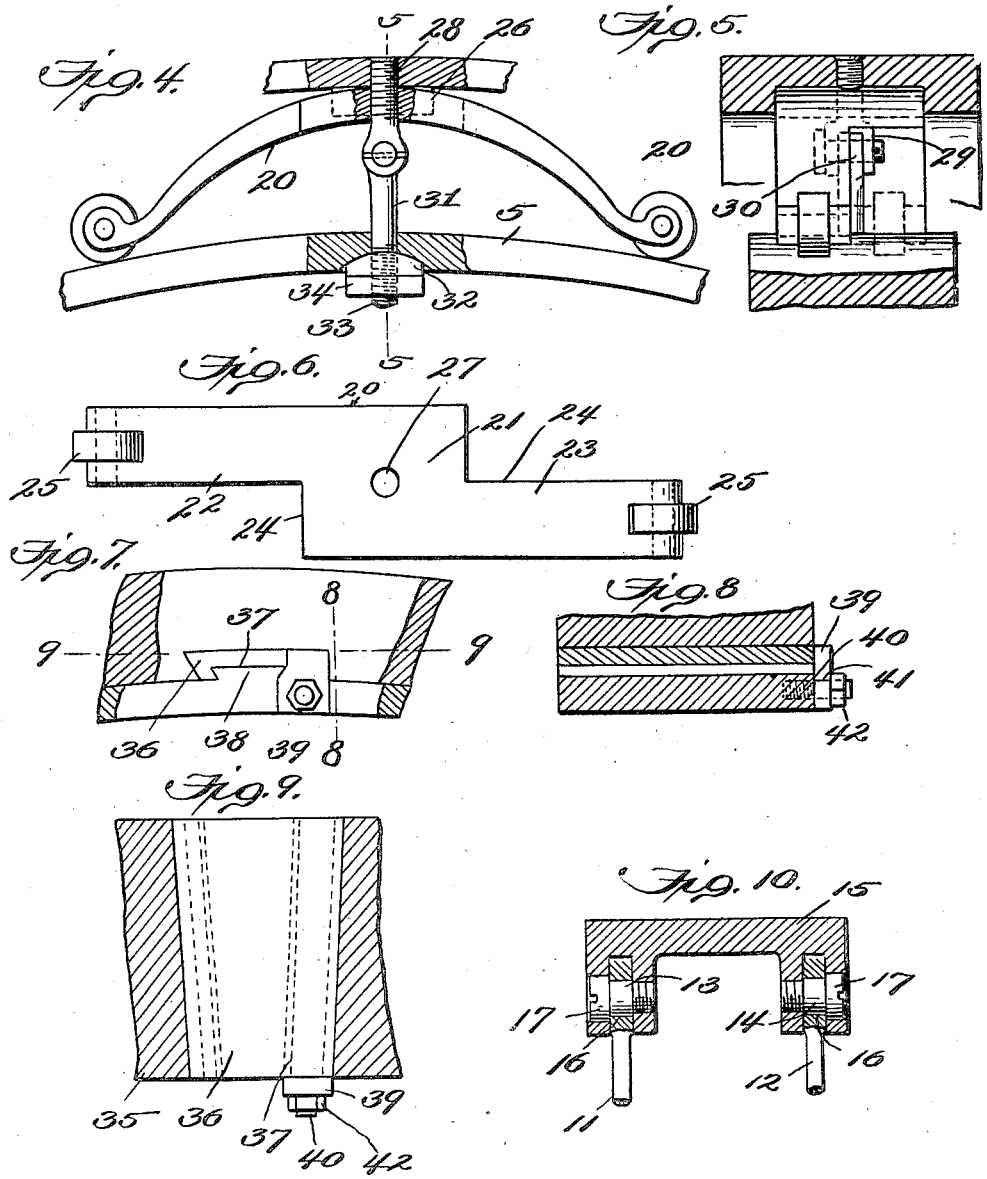

1,459,633

UNITED STATES PATENT OFFICE.

SEBASTIAN T. MECHLER, OF SAN ANTONIO, TEXAS, ASSIGNOR, BY MESNE ASSIGNMENTS, OF ONE-HALF TO JULIUS F. MECHLER, OF SAN ANTONIO, TEXAS.

CUSHION WHEEL.

Application filed September 28, 1922. Serial No. 591,134.

*To all whom it may concern:*

Be it known that I, SEBASTIAN T. MECHLER, a citizen of the United States, residing at San Antonio, in the county of Bexar and State of Texas, have invented new and useful Improvements in Cushion Wheels, of which the following is a specification.

This invention relates to resilient wheels for vehicles, and more particularly to that type of wheel wherein resilient elements are interposed between the felly of the wheel and the tire thereof for cushioning the felly relatively to the tire and obviating the necessity for using pneumatic tubes for cushioning purposes.

The primary object of the invention is to provide a wheel of the type specified with a distinct wheel felly and a tire rim movably held in spaced mounting relatively to the felly, the tire rim being movably connected to the hub by stress equalizing levers, whereby the tire rim and tire are free to respond to weight pressure on the tire, which is resisted by springs interposed between the tire rim and wheel felly for the purpose of absorbing vibrations and shocks and to obtain the same effect as is present in an ordinary pneumatic tire, and also to provide for sustaining a load imposed on the wheel. A further object of the invention is to generally improve resilient wheels of the type specified by embodying therein a novel arrangement of springs between the wheel felly and the tire rim and to coordinate the springs with the rim and felly in such manner as to set up a free spring action and also to equalize the stress on the tire and wheel as a whole in all directions and in a compensating manner.

With these and other objects and advantages in view, the invention consists in the construction and arrangement of the several parts which will be more fully hereinafter described and claimed.

In the drawings:

Fig. 1 is a side elevation of a portion of a wheel embodying the features of the invention;

Fig. 2 is a transverse vertical section taken through the center of the portion of the wheel shown by Fig. 1;

Fig. 3 is a top plan view of a portion of the tire rim;

Fig. 4 is an enlarged side elevation of a portion of the wheel felly and tire rim and one of the springs and particularly showing the manner of associating the spring with the two parts for resilient resisting and shock absorbing operations;

Fig. 5 is a transverse vertical section on the line 5—5, Fig. 4;

Fig. 6 is a top plan view of one of the springs;

Fig. 7 is an enlarged side elevation of a portion of the tire and rim and showing the manner of demountably associating the tire with the rim;

Fig. 8 is a transverse vertical section taken on the line 8—8, Fig. 7;

Fig. 9 is a horizontal section taken on the line 9—9, Fig. 7; and

Fig. 10 is a detail transverse sectional view through the tire rim, showing the manner of attaching the stress equalizing levers thereto.

The numeral 5 designates a wheel felly connected to a hub 6 by wire spokes 7 arranged as in well known forms of wire spoke wheels. The wire spokes 7 are used in the present instance to lighten as much as possible the main wheel structure to which the features of the improvement are applied. The ends of the hub 6 are circumferentially grooved as at 8 to receive movable rings 9 held in place by annular plates 10 secured to opposite ends of the hub. The rings 9 are free to rotate on the ends of the hub and serve as take-up means for a plurality of stress equalizing levers 11 and 12 having substantial tangential pivotal association with the rings 9, the levers 11 being connected to the one ring 9 and the levers 12 to the opposite ring. The two sets of levers 11 and 12 have reverse angular disposition and at their outer ends are respectively pivoted to inwardly projecting bosses 13 and 14 of a tire rim 15, the preferred manner of pivoting these levers being shown in Fig. 10 and consisting in slotting the bosses 13 and 14 as at 16 and extending the outer ends of the levers into the slots and securing the same by pivot screws 17. As shown by Fig. 3, the tire rim 15 is formed in sections 18 having diagonal end edges 19, so that each section may independently operate or have movement, the diagonal ends 19 of the sections overcoming abruptness in the end joints. The elongated joints formed by the diagonal or angular ends 19 of the sections 18 also provide for an easier action without jamming of the several sections, and furthermore, by the disposition of these end joints in diagonal planes, wear on the inner surface of the tire will be materially less than if the joints extended straight across the rim. Between the felly 5 and the rim 15 a series of bowed flat springs 20 are interposed, these springs being of the shape shown in detail by Fig. 6 and comprise a relatively wide center body 21 with arms 22 and 23 extending therefrom in reverse directions on opposite sides of the longitudinal center of the spring. By this means open seats 24 are provided at opposite extremities of the springs for a purpose which will be presently explained. In the free ends of the arms 22 and 23 anti-frictional rollers 25 are mounted for free rotation and are adapted to be held in continual contact with and bear on the felly 5. The body 21 of each spring is mounted in a recessed boss 26 secured to or forming part of each section 18 of the rim 15, and extending through the center of this boss and an opening 27 in the body 21 of the spring is a screw shank or stem 28 having an inner bifurcated head 29 in which is pivotally mounted a head 30 of a connecting bolt 31 extending through the felly 5 and a boss 32 secured thereto and having a screw-threaded extremity 33 to receive a nut 34 which is turned against the said boss, as clearly shown by Fig. 4. By this form of jointed connection the rim sections 18 are free to move proportionately to the compression and distention of each spring 20 without restriction in a circumferential direction relatively to the felly 5. The springs 20 are arranged with their extremities in close relation, or the rollers 25 and adjacent portions of the extremities of the arms 22 and 23 extend into the open seats 24 of the adjacent springs, these seats being of such length as to permit the springs to have unrestricted movement, and in fact are long enough to compensate for the maximum compression of the springs without the least interference. During the compression and distension of the springs 20, the rollers 25 freely move over the felly 5 and thereby render the springs sensitive in their operation and quick to respond without resistance, and moreover, reduce wear on the felly as well as the ends of the arms 22 and 23 of the springs to a minimum. Each section 18 has a pair of the stress equalizing levers 11 and 12 attached thereto.

On the sectional rim 15 a tire 35 is removably or demountably applied, the said tire being preferably of solid rubber or analogous material, and as will be obvious, forms the tread of the wheel. At regular intervals metal keyways 36 are inserted transversely in the inner portion of the tire, each keyway being of the contour particularly shown by Fig. 7 and has a dove-tail form to ensure retention of the said keyway in the tire and also to provide for a dove-tail groove or recess 37 therethrough. This dove-tail recess or groove receives a correspondingly shaped or dove-tailed rib 38 extending transversely across the center of each section 18, the groove 37 and the rib 38 increasing gradually in width from one end of the section towards the opposite end. At one end each keyway 36 has a depending securing flange 39 which closely contacts with the adjacent side edge of the rim section 18 when the tire is fully applied and serves as a means for securing the tire against accidental displacement, a threaded stem 40 projecting outwardly from the edge of each section 18 and the flange 39 having an opening 41 therethrough for application over this screw-threaded stem, the securement being rendered positive by the application of a nut 42 to the outer end of the stem. The nuts 42 when fully applied bear firmly against the flanges 39 of all the keyways 36, and when it is desired to remove or demount the tire, these nuts are turned off the stem 40 and permit the tire to be drawn laterally from the rim. It is obvious that a tire may be easily applied on the rim through the means specified and be held in positive connection with the rim against longitudinal movement or displacement, and moreover, when it becomes necessary to replace the tire, the detachment of the tire may be readily accomplished.

The operation of the improved wheel is comparatively simple. When the tire surface comes into contact with, or rolls around upon, the road surface or street, the rim sections 18 are successively compressed against the resistance of the springs 20 individually connected to the sections, and as the springs compress, they elongate and have their extremities pass each other, owing to the open recesses 24 in reverse positions in each spring. The inward movement of the sections 18 pushes inwardly on the levers 11 and 12 connected thereto and correspondingly shifts the rings 9 around the hub 6, the one ring rotating in one direction and the opposite ring in the reverse direction, and by this means the stress on the portion of the wheel in contact with the ground or road surface is equalized. As soon as the part of the wheel which has been in contact with the ground or road surface leaves the latter, the several sections 18 successively resume normal position, due to the tendency of the springs 20 to return to their normal bowed shape, and the outward movement of the sections 18 draws outwardly on the levers 11 and 12 connected to the said sections, and the entire wheel portion that had been acting is thereby restored to normal condition and a following portion of the wheel undergoes the same pressure operation and movement of the components of the wheel as just explained. The movable sections 18 materially contribute to the sensitive cushioning action of the tire as a whole, particularly in view of the engagement with each section of one of thes prings 20, and strain is taken from the wheel to a very large extent by the equalizing levers 11 and 12. Furthermore, it will be understood that there will be a slight circumferential shifting action of the tire as a whole relatively to the felly 5, and such operation will be materially advantageous in the general functioning of the wheel and also in reducing the wear on the rubber tread member 35. The individually movable sections 18 together with each spring 20 cooperating with the said individual sections and the equalizing levers 11 and 12 will conjointly operate to take up stresses, vibrations and shocks and materially relieve the body of the vehicle of jolts and jars as well as vibration.

What is claimed as new is:

1. The combination with a wheel having a felly, a hub and spokes between the latter and the felly, of rotatable devices on opposite ends of the hub, a tire rim surrounding the wheel felly and spaced from the latter and having a solid tire tread member thereon, the tire rim being composed of a number of independently movable sections, springs interposed between the independently movable sections and the wheel felly, and equalizing levers connected to each rim section and to the rotatable devices on the hub.

2. The combination with a wheel having a felly, a hub and spokes between the latter and the felly, of rotatable devices on opposite ends of the hub, a tire rim surrounding the felly and spaced from the latter and composed of a plurality of independently movable sections, a solid tread member surrounding the said rim sections, a spring between each section and the adjacent felly, all of the springs having freely movable ends engaging the felly, and oppositely extending equalizing levers connected to each rim section and to the rotatable devices on the wheel hub.

3. The combination with a wheel having a felly, a hub and spokes between the latter and the felly, of rotatable devices surrounding the ends of the hub, a tire rim surrounding the felly and spaced from the latter and composed of a plurality of independently movable sections, a spring secured to the center of each section and having the ends thereof in freely movable contact with the felly, a pivotal connection between each section and the felly, and equalizing levers connected to each rim section and extending in opposite directions and also attached to the rotatable devices on the ends of the hub.

4. The combination with a wheel having a felly, a hub and spokes connected to the latter and the felly, a tire rim surrounding and spaced from the felly and composed of a plurality of independently movable sections, a bowed flat spring attached to the center of each rim section and having the opposite extremities thereof formed with reversely arranged recesses to provide arms and open seats at opposite ends of said spring, the arms being provided with terminal rollers bearing upon the outer side of the felly, the opposite ends of the successive springs moving in the open seats at the ends of the springs, and oppositely extending equalizing levers attached to each rim section and to the rotatable devices on the ends of the hub.

In testimony whereof I have hereunto set my hand in presence of two subscribing witnesses.

SEBASTIAN T. MECHLER.

Witnesses:
 GEORGE J. GRASCHEL,
 M. E. BUCKLEY.